Patented Jan. 7, 1947

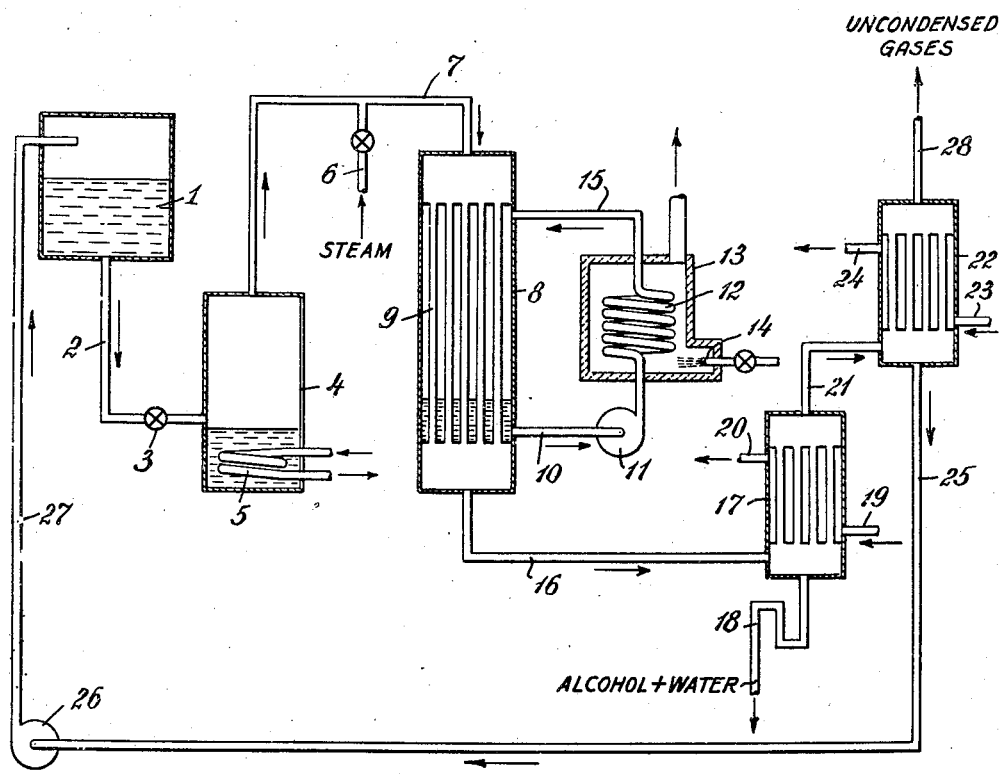

2,413,802

UNITED STATES PATENT OFFICE 2,413,802

HYDROLYSIS OF ETHYL ETHER

Richard C. Tollefson, Stamford, Conn., assignor to Air Reduction Company, Incorporated, New York, N. Y., a corporation of New York Application January 10, 1945, Serial No. 572,206

4 Claims. (Cl. 260—632)

This invention relates to the production of ethyl alcohol and particularly to an improved method of effecting the hydrolysis of ethyl ether.

It is well known that ethyl ether can be converted to ethyl alcohol by hydrolysis. Various methods employing catalysts of different kinds have been suggested for this reaction. Among these are methods employing diluted sulphuric acid as a catalyst in a procedure carried out at elevated temperatures and pressures. In other methods, solid catalysts have been used. All of the known methods operate, however, under the disadvantages that the conversion is so low as to be of no commercial significance or the yield is so low that the method is uneconomical. Moreover, in the known procedures a variety of secondary products may be formed, among them ethylene. While ethylene is a commercially useful product, it is undesirable to obtain it where the desired end product is alcohol.

It is the object of the present invention to provide a simple and effective method whereby ethyl ether may be converted by hydrolysis to ethyl alcohol at relatively high conversion rates and with good yield, so that the procedure may be employed in commercial operation.

Another object of the invention is the provision of a method of hydrolyzing ethyl ether to produce ethyl alcohol substantially without contamination with secondary products such as ethylene.

Other objects and advantages of the invention will be apparent as it is better understood by reference to the following specification and the accompanying drawing, in which an apparatus suitable for the practice of the method is diagrammatically illustrated.

The method as hereinafter described involves conversion of ethyl ether to ethyl alcohol in the presence of a catalyst. I have discovered that a satisfactory and efficient catalyst for the purpose is derived from clays variously termed "bentonites," "montmorillonites," etc., but more properly classified as "smectites." See patent to Belden and Kelley No. 1,980,569. When such clays are treated with hot dilute acid, usually sulphuric acid of about 25% concentration, certain soluble constituents are removed. The material may be subjected to heat treatment in the presence of acid at temperatures of about 275° F. or even up to 750° F. The excess acid and soluble salts are separated by a suitable water wash. The resulting product is a clay having a greatly increased adsorptive capacity which has been used heretofore for decolorizing animal and vegetable oils, sugar syrups, fats, waxes and the like.

The methods of treating such clays and the products are well known in the art. The methods are described in the patents to Baylis Nos. 1,776,990, 1,792,625, 1,818,453 and 1,819,496 and in various other patents. The particular material which I find most satisfactory for the purpose of the present invention is sold under the brand name of "Superfiltrol." However other similar materials may be employed.

An aqueous extract obtained by shaking 50 grams of activated clay of the type described with 100 cc. of distilled water at room temperature had a pH, determined by means of a glass electrode, varying from 3.03 to 6.80. The composition and the pH may vary considerably. While I do not wish to be restricted to any theory, I believe that the value of such activated clays for the purpose of the present invention depends upon their physical conformation rather than upon the chemical composition.

As catalysts, the activated clays may be used in the form of irregular pieces of suitable size or they may be formed into suitable shapes by extrusion, pelleting and the like. I have found that short rods or pellets about one-eighth of an inch in diameter and one-quarter of an inch long give excellent results in vapor phase hydrolysis of ethyl ether. The activated clays, whether pelleted or not, have good mechanical strength and are well adapted for use in the usual types of catalytic reactors.

In carrying out the invention, I may employ any suitable apparatus, for example the apparatus illustrated in the drawing, in which a supply of ethyl ether to be hydrolyzed is maintained in the storage tank 1. The ethyl ether is withdrawn through a pipe 2 and admitted through a valve 3 into a boiler 4 which is supplied with heat by means of a coil 5. Steam or any other suitable heating medium may be maintained in the coil. The ether is vaporized and is mixed with steam introduced in the proper proportion through a pipe 6. The mixture passes through a pipe 7 to a reaction chamber 8 having a plurality of tubes 9 therein which may be filled substantially with the catalyst as hereinbefore described. The tubes 9 are surrounded by vapors of a suitable heating medium, preferably a high boiling heat transfer material such as "Dowtherm," a mixture of diphenyl and diphenyl oxide. The temperature of the catalyst can be maintained at the desired point by such vapors, which in turn are heated to the minimum temperature which will afford substantially complete conversion of the ether to alcohol.

The condensed vapors of the heat transfer material are withdrawn from the reaction chamber 8 through a pipe 10 and pump 11 and are circulated by means of the pump through a heating coil 12 within a furnace 13. The heat transfer material is thus heated to the desired temperature by hot gases supplied in any suitable manner as for example by an oil burner 14. The vapors from the heating coil pass through a pipe 15 to the reaction chamber.

As the mixture of ether and steam passes through the catalyst within the tubes 9, hydrolysis is effected to convert the ether to alcohol which escapes through a pipe 16 to a partial condenser 17 wherein the vapors of ethyl alcohol and water are condensed and withdrawn through pipe 18. This condenser is cooled with water which enters through pipe 19 and leaves through pipe 20 and the temperature of the exit end of this partial condenser is maintained at a temperature slightly above the boiling point of ether. The mixture of ethyl alcohol and water withdrawn from condenser 17 may be subjected to fractional distillation in the usual manner for the recovery of the ethyl alcohol.

The uncondensed ether vapors pass through pipe 21 to condenser 22 wherein the ether vapors are condensed by means of cooling water introduced through pipe 23 and leaving through pipe 24. The condensed ether is conveyed from condenser 22 through pipe 25 to pump 26 by means of which it is returned through pipe 27 to storage vessel 1. Ethylene, if present, is withdrawn from condenser 22 through pipe 28.

The temperature at which the operation may be conducted varies over a fairly wide range. However, with the catalyst described it is possible to operate at much lower temperatures than have normally been used with other catalysts in carrying out this reaction. For example, I have found that temperatures between 200° and 250° C. afford satisfactory results. The optimum temperature is probably between 210° and 220° C.

As an example of the invention, in an apparatus such as that described, the tubes were filled with Superfiltrol X-358 in the form of one-eighth by one-quarter inch pellets. A mixture of ethyl ether and steam was fed to the catalyst under the conditions and with the results hereinafter tabulated.

| | | |
|---|---|---|
| Temp., °C | 210 | 230–240 |
| Ether feed, gm./hr | 75 | 115 |
| Water feed, gm./hr | 145 | 146 |
| Percent conversion to alcohol | 19.3 | 32.3 |
| Conversion to ethylene | 0.2 | 4.5 |
| Percent yield of alcohol | 97.5 | 87 |

The proportion of ether to water vapor in the operation of the method does not appear to be critical. Good results are obtainable with proportions by weight of water to ether of 1.27 to 1.93. However, other proportions may be used, it being apparent that a surplus of water in the feed will result primarily merely in increasing the water condensate following the reaction.

The conversion rate and yield of alcohol as shown by the foregoing examples is particularly striking. These factors are such as to permit economical practice of the invention, and since the necessary equipment is simple, the method affords practicable means for converting ethyl ether to ethyl alcohol in commercial practice.

The essential of the invention is the employment in the method of a suitable catalyst of the type hereinbefore described. As hereinbefore noted, other solid catalysts have been suggested for this reaction, but so far as I am aware, no method capable of producing the results described herein has been available heretofore. The catalyst develops a wholly unexpected improvement in the result obtainable by the procedure described.

Various changes may be made in the details of procedure and in the method of operation and apparatus used without departing from the invention or sacrificing any of the advantages thereof.

I claim:

1. The method of converting ethyl ether to ethyl alcohol which comprises passing a mixture of ether and water vapors over a heated catalyst consisting of an acid treated clay of the smectite type.

2. The method of converting ethyl ether to ethyl alcohol which comprises passing a mixture of ether and water vapors over a heated catalyst consisting of an acid treated clay of the smectite type at a temperature between 200° and 250° C.

3. The method of converting ethyl ether to ethyl alcohol which comprises passing a mixture of ether and water vapors over a heated catalyst consisting of a clay of the smectite type activated by treatment with acid and washing to remove excess acid and soluble salts.

4. The method of converting ethyl ether to ethyl alcohol which comprises passing a mixture of ether and water vapors at a temperature between 200° and 250° C. over a heated catalyst consisting of a clay of the smectite type activated by treatment with acid and washing to remove excess acid and soluble salts.

RICHARD C. TOLLEFSON.